United States Patent [19]

Cox et al.

[11] Patent Number: 5,070,725

[45] Date of Patent: Dec. 10, 1991

[54] WATER-CUT MONITORING MEANS AND METHOD

[75] Inventors: Percy T. Cox; Theodore W. Nussbaum; Charles L. Gray, Jr., all of Houston, Tex.

[73] Assignee: Texaco Inc., White Plains, N.Y.

[21] Appl. No.: 405,996

[22] Filed: Sep. 12, 1989

[51] Int. Cl.$^5$ ............................................. G01N 27/22
[52] U.S. Cl. .................................................. 73/61.1 R
[58] Field of Search .................... 73/61.1 R, 61 R, 53; 324/664, 665, 689

[56] References Cited

U.S. PATENT DOCUMENTS

| | | | |
|---|---|---|---|
| 3,222,928 | 12/1965 | Walker | 73/61.1 R X |
| 3,528,282 | 9/1970 | Stotts, Jr. et al. | 73/61.1 R |
| 4,215,567 | 8/1980 | Vlcek | 73/61.1 R |
| 4,240,028 | 12/1980 | Davis, Jr. | 324/61 R |
| 4,689,989 | 9/1987 | Aslesen et al. | 73/61.1 R |
| 4,774,680 | 9/1986 | Agar | 364/550 |
| 4,873,648 | 10/1989 | Mouser et al. | 73/61.1 R X |
| 4,881,412 | 11/1989 | Northedge | 73/861.04 |

Primary Examiner—Hezron E. Williams
Assistant Examiner—Joseph W. Roskos
Attorney, Agent, or Firm—Robert A. Kulason; James J. O'Loughlin; Ronald G. Gillespie

[57] ABSTRACT

Oil well production is often measured by using a settling tank, pump, flowmeter and a water-cut meter. Fluid from a well being tested is allowed to accumulate in the settling tank and, after a predetermined settling time, is pumped through the flowmeter and water-cut meter for gauging. The present invention is an improved water-cut meter which first determines the impedance of the free water pumped from the tank and later determines the impedance of the oil/water emulsion emerging from the tank. The ratio of the emulsion impedance to the free water impedance is proportional to percent water-cut of the fluid during the water-continuous phase. When the emulsion switches to oil-continuous phase, the system utilizes probe impedance for the water-cut determination. Using standard techniques, the water-cut and flow rate signals are then combined to calculate the total oil and water content of the settling tank fluid.

21 Claims, 4 Drawing Sheets

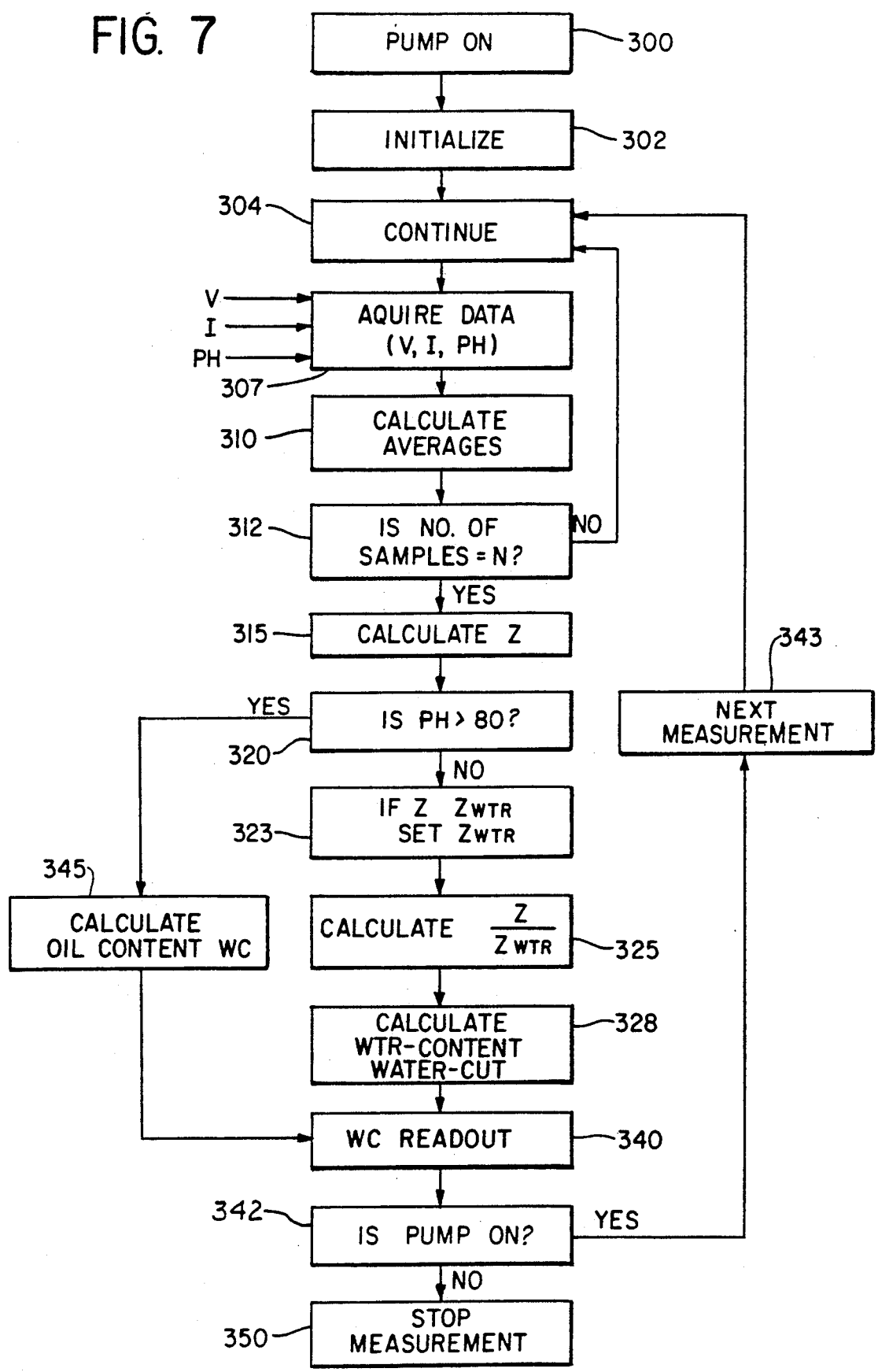

WATER-CUT MONITORING MEANS AND METHOD

BACKGROUND OF THE INVENTION

FIELD OF THE INVENTION

The present invention relates to monitors in general and, more particularly, to monitor means and methods for monitoring the water content of the production from an oil well.

SUMMARY OF THE INVENTION

A water-cut production analyzer includes a settling tank for accumulating a quantity of fluid produced from a petroleum producing well. The fluid is removed from the settling tank after a predetermined time interval in the form of a stream. A flow rate meter provides a signal representative of the flow rate of the stream. A water-cut meter measures the water-cut of the stream of fluid and provides a corresponding signal utilizing an impedance ratio, in which the denominator is the impedance determined when the fluid in the stream is free water and the numerator is the impedance of the stream, when the fluid is free water or in the water-continuous phase and utilizing an impedance of the fluid when the fluid is in the oil-continuous phase. The water content and/or the oil content of the accumulated fluid is determined in accordance with the water-cut signal and the flow rate signal.

The objects and advantages of the invention will appear more fully hereinafter from a consideration of the detailed description which follows, taken together with the accompanying drawings, where one embodiment of the invention is illustrated by way of example. It is to be expressly understood, however, that the drawings are for illustration purposes only and are not to be construed as defining the limits of the invention.

DESCRIPTION OF THE DRAWINGS

FIG. 7 is a flow chart showing the programming of the process means of FIG. 6 for the measurement of water-cut in accordance with the present invention.

DESCRIPTION OF THE INVENTION

Oil field production is defined in terms of barrels of oil per day (BOPD) and barrels of water per day (BWPD). These figures are determined by the measurement of flow rate and water-cut. Many commercial flowmeters are available which yield satisfactory flow values. A number of commercial water-cut meters are also available. Most of these meters, however, are designed for use only when the oil/water mixture is oil-continuous, i.e., when any water present is suspended within the oil. These meters function purely as a capacitance measurement and operate properly only when a non-conducting (high impedance) path exists across the measurement electrodes. In water-continuous emulsions, a conducting path exists across the probe which essentially "shorts out" the capacitance measurement. This shorting effect is highly sensitive to salinity and temperature changes and renders standard capacitance probes useless in water-continuous operation when only a few ppm of salt is present.

Texaco has several major fields where very fresh waters and relatively heavy oil make water-cut measurement difficult. Suitable low cost commercial meters which operate over the entire 0-100 percent range of water-cut have not been found. The present invention solves the problem of cost and can operate over the entire 0-100 percent range of water-cut even where fresh water and heavy oil emulsions are involved.

At one of Texaco's oils fields there are about 172 automatic well test (AWT) sites and each site can gauge up to 36 producing wells. Each AWT site has its own process controller. Each well is sequentially gauged by allowing its production to fill a settling tank for up to four hours, while both heat and emulsion breaking chemicals are added to the fluids to promote separation. Fluid separation is hard to achieve, however, because the oil is heavy (13.2 gravity) and the water is light (very fresh).

Figure 1:
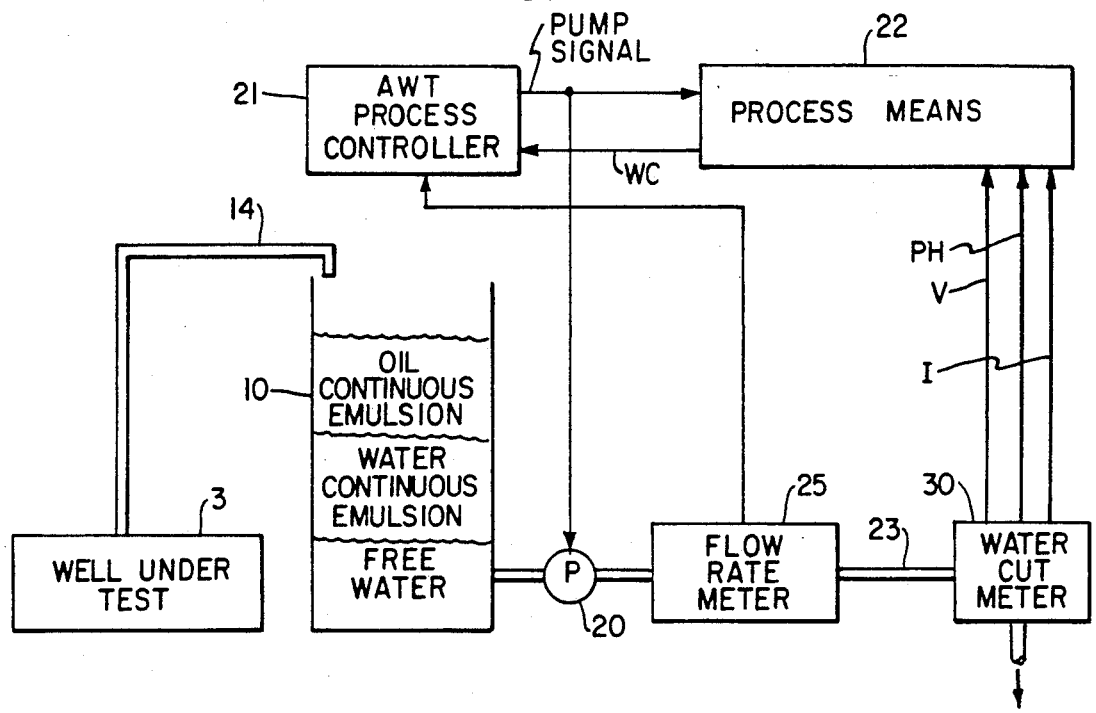
FIG. 1 is a partial simplified block diagram and a partial schematic drawing of a water cut analyzer constructed in accordance with the present invention.

With reference to FIG. 1, there is shown a well under test 3 providing a production stream to a settling tank 10 via a line 14. After a predetermined quantity of the production stream has entered settling tank 10 further filling of settling tank 10 is stopped. Over a predetermined period of time the fluid in settling tank 10 will partially separate to provide free water at the bottom of tank 10; above this a water-continuous emulsion exists, and finally at the top of tank 10 the fluid is an oil-continuous emulsion. After the predetermined period of time has elapsed, a pump 20, controlled by the AWT process controller 21, pumps the fluid from the bottom of tank 10 through a flowmeter 25 and thence through a water-cut meter 30, where the fluid is finally discharged from water-cut meter 30 and returned to the production system.

Figure 2A:
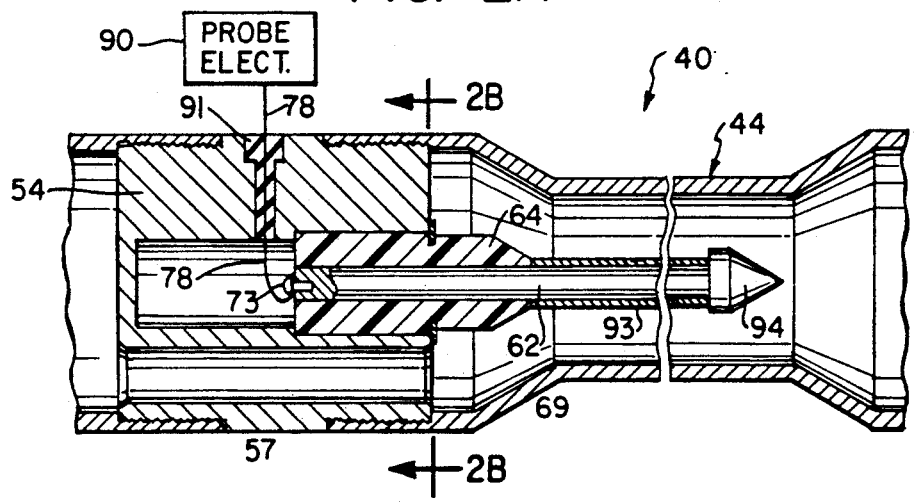
FIG. 2A is a representative drawing of a water-cut meter shown in FIG. 1.
Figure 2B:
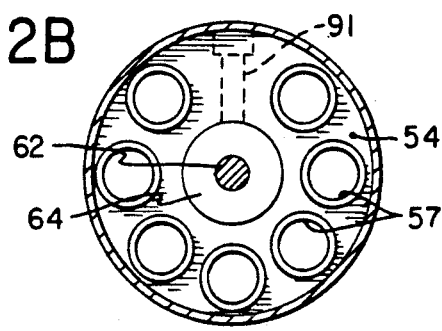
FIG. 2B is a cross-sectional view taken along the line B—B in FIG. 2A.

Referring now to FIGS. 2A and 2B, there is shown water-cut meter 30 having a sensing unit 40 mounted in pipe 23 having a constriction section 44. Sensing unit 40 has a support body 54 having a plurality of channels 57 passing through it to permit flow of the petroleum stream through support body 54. Support body 54 provides for rigid mounting of a probe 62 which is mounted within a probe housing 64 made of non-conductive material. Probe 62 has two diameters. That portion of probe 62 extending outside of probe housing 64 has a larger diameter, while that portion of probe 62 located within housing 64 has a small diameter. Probe housing 64 is held in support body 54 by a brass fitting 69. A terminal 73 is affixed to probe 62 and has an electrical wire 78 connected thereto so that there is an electrical connection between probe 62 and probe electronics 90 as hereinafter described. Wire 78 passes through an insulator 91 located in support body 54 permitting wire 78 to pass from probe 62 to the side of the sensing unit 40. Probe 62 is made of aluminum and has a heat-shrinkable coating 92 on that portion of its surface which is exposed to the fluid being tested. Coating 92 is a 0.010 inch thickness of Kynar. A deflection head 94 is affixed to one end of probe 62 to deflect the fluid flow thus preventing potential damage to coating 93.

Figure 3:
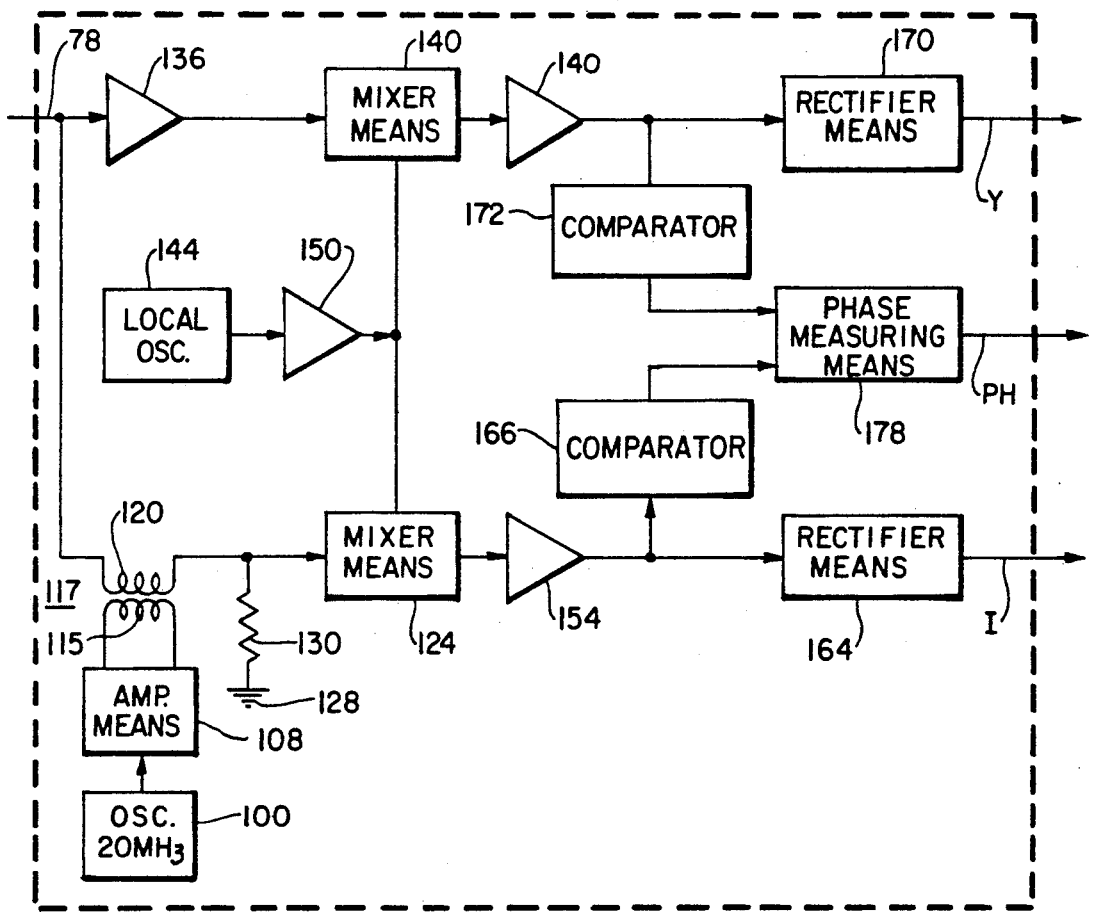
FIG. 3 is a detailed block diagram of the probe electronics of FIG. 2A.

With reference to FIG. 3, probe electronics 90 includes an oscillator 100 which provides a high frequency signal selected from a range of frequencies from 1 MHz to 60 MHz, to amplifier means 108. A preferred frequency is 20 MHz. Amplifier means 108 provides an amplified signal across a winding 115 of a toroidal transformer 117, causing an induced signal across another winding 120 of transformer 117. One end of winding 120 is connected to the probe 62 via electrical wire 78. The other end of winding 120 is connected to mixer means 124 and to a ground 128 through a resistor 130. Wire 78 is connected to an impedance matching amplifier 136, whose output is connected to another mixer means 140.

A local oscillator 144 provides a 19.99 MHz signal to an amplifier 150. The amplified 19.999 MHz signal is provided to mixer means 124 and 140. The one KHz outputs of mixer means 124 and 140 are provided to IF amplifiers 154 and 160, respectively. The output from IF amplifier 154 is provided to rectifier means 164 and to a comparator 166. Similarly the output of IF amplifier 160 is provided to rectifier means 170 and to a comparator 172.

Rectifier means 164 provides a signal I corresponding to the probe current in wire 78; while rectifier means 170 provides a signal V corresponding to the probe voltage. The outputs from comparators 172 and 166 are provided to phase measuring means 178 which provides a signal PH related to the phase difference between the voltage and current signals in sensing unit 40 as affected by the production stream.

In operation, as the oil and water mixture in the production stream affects sensing unit 40 it causes a change of the voltage and current signals being provided to sensing unit 40 by the oscillator 100 and amplifier means 108 and transformer 117. A signal proportional to the probe voltage is picked off by amplifier 136 and heterodyned to a 1 KHz intermediate frequency by mixer means 140. Meanwhile mixer means 124 takes the 20 Mhz signal proportional to probe current and heterodynes it to the same 1 Khz intermediate frequency. The two intermediate frequencies are amplified by IF amplifiers 154 and 160 so that rectifier means 164 provides a direct current signal corresponding to probe current while rectifier means 170 provides a direct current signal corresponding to probe voltage. As noted, phase measuring means 178 provides a DC signal corresponding to the phase difference between the probe voltage and the probe current.

WATER CONTINUOUS MEASUREMENT METHOD

The well under test 3 is allowed to fill settling tank 10 until sufficient fluid is accumulated. Pump 20 is then actuated by AWT process controller means 21. The initial fluid passing through water-cut meter 30 is water which has settled to the bottom of tank 10. The impedance of this water is measured The impedance is then continuously measured as the fluid from tank 10 changes to a water-continuous emulsion. The value of water impedance is retained, as hereinafter explained, and used with the emulsion impedance to calculate an impedance ratio. It has been discovered that the impedance ratio is an accurate measure of percent water-cut and independent of water salinity and temperature changes over the range of salinity and temperature encountered in many fresh water oil fields.

Figure 4:
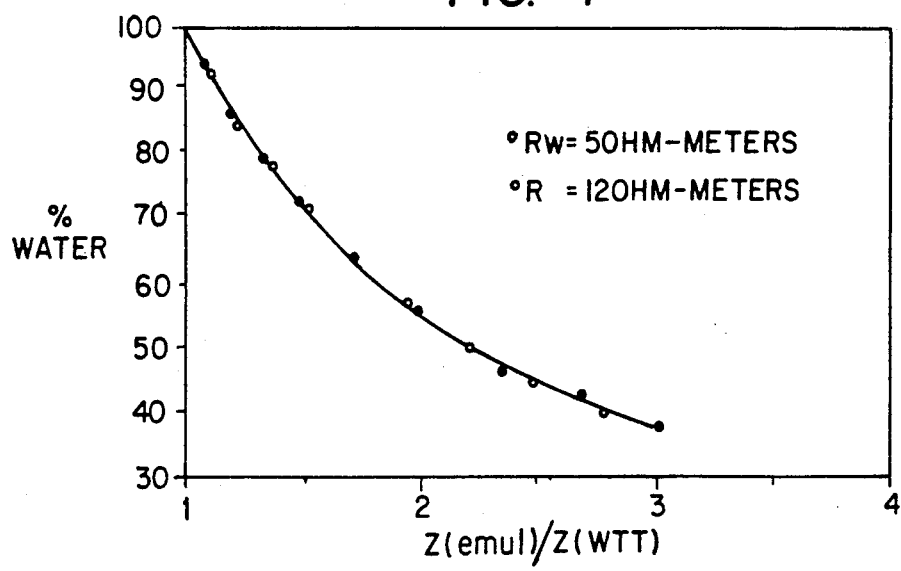
FIG. 4 is a graphical representation of water-cut versus impedance ratio for the water-continuous phase of a fluid being tested by the analyzer of the present invention.

A typical water-cut versus impedance ratio curve is shown in FIG. 4. At 100% water-cut the ratio is 1, and as oil is added, the emulsion impedance increases and thus the ratio increases. Data for two different salinities are plotted on the graph to illustrate the absence of sensitivity to salinity change. The percent water-cut will decrease as the settling tank empties, until the emulsion becomes so laden with oil that it switches to the oil-continuous phase where the water is suspended within the oil. At this point, the impedance of the fluid increases dramatically and the method of measurement changes.

OIL-CONTINUOUS MEASUREMENT METHOD

Figure 5:
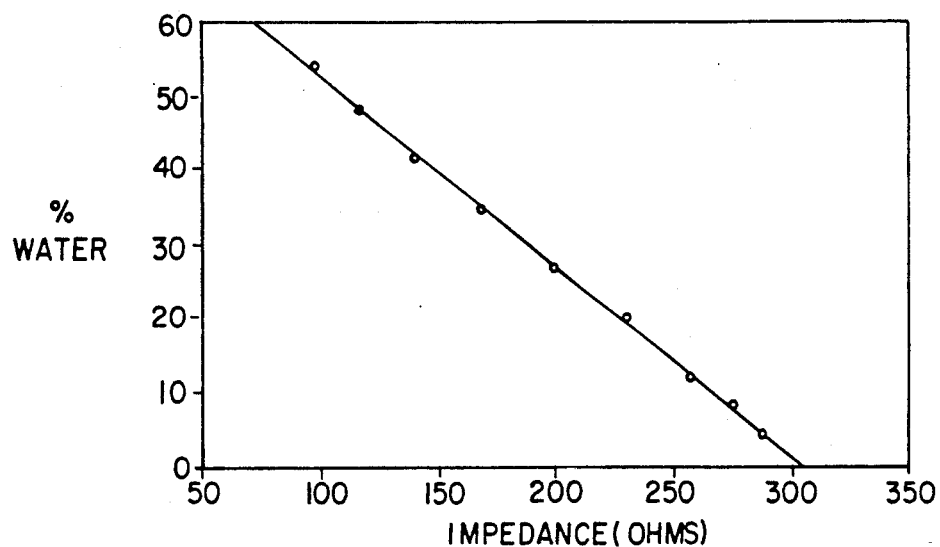
FIG. 5 is a graphical representation of water-cut versus impedance for the oil-continuous phase of a fluid being tested by the analyzer of the present invention.

When the emulsion becomes oil-continuous, coated probe 62 takes on many of the characteristics of a standard capacitance-type water-cut meter. By measuring probe 62 impedance at a much higher frequency (20 megahertz as opposed to several hundred kilohertz), the impedance of probe 62 is much more linear with water-cut than commercial probes. Since the water molecule is suspended within an insulator (the oil), the conductivity of the water (and thus salinity and temperature) has little effect on the measured probe 62 impedance. Thus a simple probe impedance measurement yields accurate values of oil-continuous water-cut. A typical water-cut versus impedance curve for oil-continuous emulsions is shown in FIG. 5.

A reliable means has been found for switching the interpretation method from water to oil-continuous as the fluid changes phase. For this the electrical phase angle between the measured 20 megahertz voltage and current is used. When the emulsion switches to oil-continuous, the probe impedance becomes essentially capacitive and the resulting phase angle approaches 90 degrees (current leading). Thus whenever the measured phase angle exceeds 80 degrees, for example, the interpretation is automatically switched to the oil-continuous measurement method.

WATER-CUT CALCULATION MICROPROCESSOR

Figure 6:
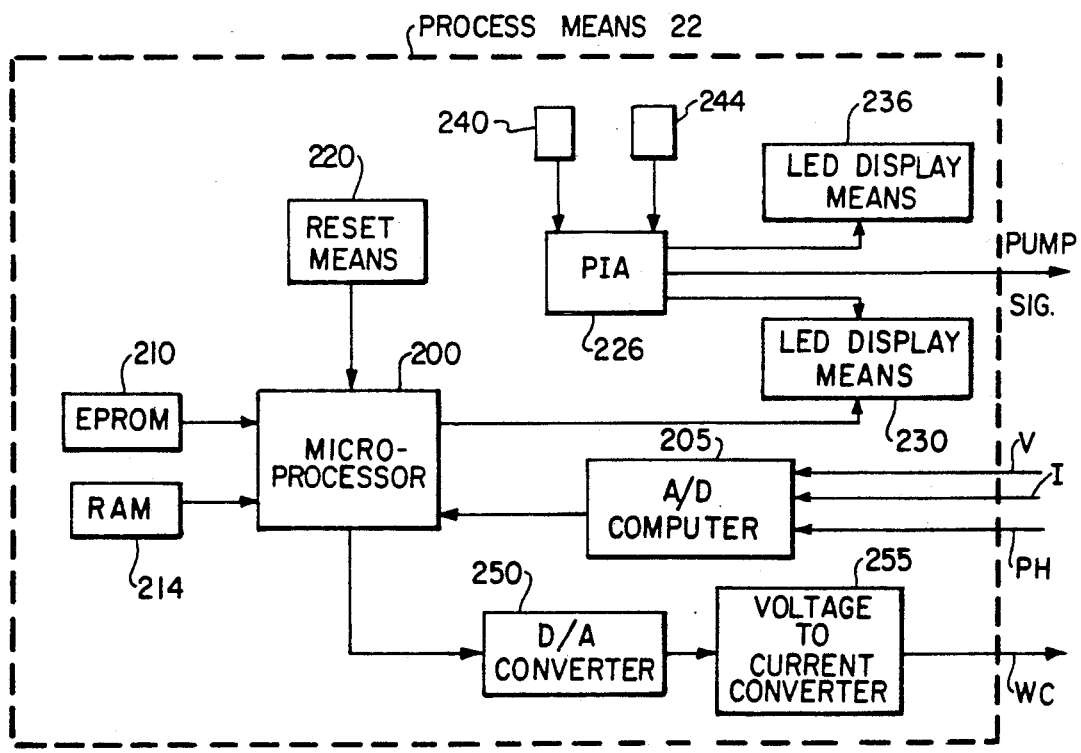
FIG. 6 is a detailed block diagram of the process means shown in FIG. 1.

With reference to FIG. 6, a microprocessor 200, which is the heart of process means 22, has been designed to control the acquiring of data, the calculation of all impedances, the calculation of water-cut and the display of required values.

Signals V, I and PH from the water-cut meter 30 are converted to digital signals by an analog-to-digital converter 205 and provided to microprocessor 200. Associated with microprocessor 200 is an erasable programmable memory (EPROM) 210 which stores variables essential to the water-cut calculation, a random access memory (RAM), 214 which contains programs and equations hereinafter explained. Also associated with microprocessor 200 is reset means 220 for resetting microprocessor 200, peripheral interface adaptor (PIA) 226, and a liquid crystal display 230 which is also connected to PIA 226. Further there is a light emitting dioide (LED) display means 236 connected to PIA 226. There are two other switches associated with PIA 226 and they are pump simulating switch 240 and an operating/calibrating switch 244.

The water-cut calculated by microprocessor 200 is provided to a digital-to-analog converter 250 which converts the water-cut values to analog form and provided as signal WC.

The d.c. water-cut voltages are then converted to standard 4-20 ma current form by action of the voltage-to-current converter 255. Thus water-cut signal, in standard 4-20 ma format, is provided to the AWT process controller 21.

Microprocessor 200 operation in determining the water-cut is best explained by referring to the flow chart shown in FIG. 7. A pump-on-signal from the AWT process controller (block 300) causes microprocessor 200 to initialize all variables required for water-cut measurement (block 302). A continue mode represented by block 304 is the next step. From there, block 307 represents the acquiring of data, namely signals V, I, and PH by microprocessor 200. Following the acquisition step averages for N samples are calculated as represented by block 310. The average value of each input, namely V, I, or PH, is then calculated for N number of samples as represented by block 312 with the question "is number of samples equal to N?" If the answer is yes, block 315 calls for the calculation of impedance Z using the measured values of probe 62 voltage and current.

Next, microprocessor 200 determines if the phase angle is greater or less than 80 degrees as represented by block 320. If the phase angle is less than 80 degrees, microprocessor 200 decides if the measured impedance Z is less than the previous value of Z water, that is, the impedance of the water. If true, Z water is then set equal to Z. This technique, represented by block 323, determines the lowest calculated value of impedance and calls it Z water. The impedance ratio, $$ZR = Z/(Z \text{ water}) \quad (1)$$

is then calculated as represented in block 325. A ratio of 1 results when Z equals (Z water). When the emulsion flows through water-cut meter 30, Z increases and therefore ZR increases. Microprocessor 200 uses an equation:

$$WC = A + B(ZR) + C(ZR)^2 + D(ZR)^3 \quad (2)$$

where A, B, C and D are coefficients which are determined using conventional curve fitting techniques. Equation (2) is used to calculate the water-continuous water-cut WC from the impedance ratio ZR. This is represented by block 328. The water-cut value is shown on a digital readout by LED display means 236, illustrated by block 340. Although not shown as a block in the flow diagram, the water-cut value is also provided to the oil field's automatic well test instrumentation for calculation of BOPD and BWPD as indicated in FIG. 6. Microprocessor 200 then determines if the pump is still on in block 342 and if the pump is on microprocessor 200 recycles for another measurement.

When the emulsion becomes oil continuous, the phase angle exceeds 80 degrees and, as provided for in block 320, the answer to that question is yes. Microprocessor 200 then calculates an oil-continuous water-cut provided for in block 345 using the following equation:

$$WC = E + F(Z) \quad (3)$$

where E and F are coefficients which are determined by using conventional curve fitting techniques. This value is then displayed by the LED display means 236 as represented by block 340. If block 312, which poses the question "is the number of samples equal to N?" yields a no answer, microprocessor 200 cycles back to the continue step block 304 and then continues to loop through steps 307, 310 and 312 until the answer from block 312 is yes.

In regards to the question presented in block 342, "is pump on?" if the answer is no, the next block represents a stop measurement function in which the measurement is stopped.

The water-cut value determined by microprocessor 200 is converted to a 4-20 ma output signal by action of the D/A converter 250 and the voltage-to-current converter 255 as seen in FIG. 6. This signal along with the flow rate signal from flowmeter 25 are both provided to the AWT Process Controller 21 as shown in FIG. 1. The Process Controller uses these signals to calculate BOPD and BWPD (Barrels of oil and barrels of water per day) for the well being tested.

What is claimed is:

1. An oil well production analyzer comprising:
   accumulating means for accumulating a quantity of fluid from a producing oil well,
   removal means connected to the accumulating means for removing the fluid from the accumulating means as a stream of fluid, after a predetermined time interval from the accumulation of the fluid by the accumulating means so as to allow the accumulated fluid to separate into three phases: free water, water-continuous and oil-continuous,
   flow rate means connected to the removal means for measuring the flow rate of the stream of fluid and providing a flow rate signal corresponding thereto;
   water cut means connected to the removal means for measuring the water-cut of the stream of fluid and providing a water-cut signal representative thereof utilizing an impedance ratio when the stream fluid is either free water or in the water-continuous phase, and
   means for determining the water content and/or the oil content of the accumulated fluid in accordance with the water-cut signal and the flow rate signal.

2. An analyzer as described in claim 1 in which the water-cut means determines the water-cut (WC) of the fluid in a water-continuous phase in accordance with the following equation $$WC = A + B(ZR) + C(ZR)^2 + D(ZR)^3 \quad (a)$$

where A, B, C and D are coefficients and ZR is the impedance ratio.

3. An analyzer as described in claim 2 in which the impedance ratio is set forth in the following equation $$ZR = Z/(Z \text{ water}) \quad (b)$$

where ZR is the impedance ratio, Z is the measured impedance of the stream of fluid and (Z water) is the measured impedance of the stream of fluid when the fluid in the stream is free water.

4. An analyzer as described in claim 3 in which the water-cut means determines the water-cut WC in accordance with the following equation when the fluid in the stream is in the oil continuous phase $$WC = E + F(Z) \quad (c)$$

where E and F coefficients and Z is the fluid impedance.

5. An oil well production analyzer comprising:
accumulating means for accumulating a quantity of fluid from a producing oil well,
removal means connected to the accumulating means for removing the fluid from the accumulating means as a stream of fluid, after a predetermined time interval from the accumulation of the fluid by the accumulating means so as to allow the accumulated fluid to separate into three phases; free water, water-continuous and oil-continuous,
flow rate means connected to the removal means for measuring the flow rate of the stream of fluid and providing a flow rate signal corresponding thereto,
water cut means connected to the removal means for measuring the water-cut of the stream of fluid and providing a water-cut signal representative thereof utilizing an impedance ratio when the stream fluid is either free water or in the water-continuous phase, and
means for determining the water content and/or the oil content of the accumulated fluid in accordance with the water-cut signal and the flow rate signal; and
in which the water-cut meter includes:
probe means inserted in the stream of fluid for being responsive to the impedance of the fluid,
means connected to the probe means for providing the high frequency signal in the range of 1 to 60 MHz to the probe means which is affected by the impedance of the stream,
means connected to the probe means for providing a current signal and a voltage signal proportional to the impedance of the fluid filled probe, and,
means receiving the current signal and the voltage signal for providing a signal related to the phase difference between the current and voltage signals.

6. An analyzer as described in claim 5 in which the water-cut means determines the impedance of the fluid in accordance with the current signal, the voltage signal and the phase difference signal.

7. An analyzer as described in claim 6 in which the water-cut meter utilizes equations (a) and (b) when the phase difference signal indicates a phase difference less than a predetermined value and utilizes equation (c) when the phase difference signal indicates a phase difference equal to or greater than the predetermined value.

8. A method of analyzing a fluid produced from an oil well comprising the steps of:
accumulating a quantity of the fluid from the oil well in a tank,
allowing the accumulated fluid to separate into three phases: free water, water-continuous and oil-continuous,
removing the separated fluids from the tank as a stream of fluid,
measuring the flow rate of the stream of fluid,
providing a flow rate signal corresponding thereto,
measuring the water-cut of the stream of fluid by utilizing an impedance ratio when the stream fluid is either free water or in the water-continuous phase and by utilizing an impedance of the fluid when the fluid in the stream is in the oil-continuous phase,
providing a water-cut signal corresponding to the measuring of the water-cut, and
determining the water content and/or the oil content of the accumulated fluid in accordance with the water-cut signal and the flow rate signal.

9. A method as described in claim 8 in which the water-cut measuring step includes:
determining the water-cut of the free water and when the fluid is in a water-continuous phase in accordance with the following equation $$WC = A + B(ZR) + C(ZR)^2 + D(ZR)^3 \quad \text{(a)}$$

where WC is the water-cut and A, B, C and D are coefficients and ZR is the impedance ratio.

10. A method as described in claim 9 in which the impedance ratio is set forth in the following equation $$ZR = Z/(Z \text{ water}) \quad \text{(b)}$$

where ZR is the impedance ratio, Z is the measured impedance of the stream of fluid and (Z water) is the measured impedance of the stream of fluid when the fluid in the stream is free water.

11. A method as described in claim 10 in which the water-cut step includes:
determining the water-cut in accordance with the following equation when the fluid in the stream is in the oil-continuous phase $$WC = E + F(Z) \quad \text{(c)}$$

where WC is the water-cut, E and F are coefficients, and Z is the probe impedance.

12. A method of analyzing a fluid produced from an oil well comprising the steps of:
accumulating a quantity of the fluid from the oil well in a tank,
allowing the accumulated fluid to separate into three phases: free water, water-continuous and oil-continuous,
removing the separated fluids from the tank as a stream of fluid,
measuring the flow rate of the stream of fluid,
providing a flow rate signal corresponding thereto,
measuring the water-cut of the stream of fluid by utilizing an impedance ratio when the stream fluid is either free water or in the water-continuous phase and by utilizing an impedance of the fluid when the fluid in the stream is in the oil-continuous phase,
providing a water-cut signal corresponding to the measuring of the water-cut, and
determining the water content and/or the oil content of the accumulated fluid in accordance with the water-cut signal and the flow rate signal; and
in which the water-cut measuring step includes:
inserting a probe in the stream of fluid which is responsive to the impedance of the fluid,
providing a high frequency signal in the range of 1 to 60 MHz to the probe means which is affected by the impedance of the fluid in the stream,
providing a current signal and a voltage signal proportional to the impedance of the fluid filled probe, and
providing a signal related to the phase difference between the current and voltage signals.

13. A method as described in claim 12 in which the water-cut measuring step includes:
   determining the impedance of the fluid in accordance with the current signal, the voltage signal and the phase difference signal.

14. A method as described in claim 13 in which the water-cut measuring step includes:
   utilizing equations (a) and (b) when the phase difference signal indicates a phase difference less than a predetermined value and utilizing equation (c) when the phase difference signal indicates a phase difference equal to or greater than the predetermined value.

15. Water cut monitor comprising:
   measuring means for measuring the impedance of a stream of fluid and providing an impedance signal representative thereof,
   ratio means connected to the measuring means for determining an impedance ratio using the impedance signal and providing an impedance ratio signal,
   water cut means connected to the ratio means for determining the water cut of the fluid stream in accordance with the impedance ratio when the fluid is in a water-continuous phase and in accordance with the impedance signal when the fluid is in an oil-continuous phase.

16. A water cut monitor comprising:
   measuring means for measuring the impedance of a stream of fluid and providing an impedance signal representative thereof,
   ratio means connected to the measuring means for determining an impedance ratio using the impedance signal and providing an impedance ratio signal, and
   water cut means connected to the ratio means for determining the water cut of the fluid stream in accordance with the impedance ratio when the fluid is in a water-continuous phase and in accordance with the impedance signal when the fluid is in an oil-continuous phase; and
   in which the water-cut means determines the water-cut (WC) of the fluid in the water-continuous phase in accordance with the following equation $$WC = A + B(ZR) + C(ZR)^3 \qquad (a)$$

where A, B, C and D are coefficients and ZR is the impedance ratio.

17. A monitor as described in claim 16 in which the impedance ratio is set forth in the following equation $$ZR = Z/(Z\text{ water}) \qquad (b)$$

where ZR is the impedance ratio, Z is the measured impedance of the stream of fluid and (Z water) is the impedance of free water from the stream of fluid.

18. A monitor as described in claim 17 in which the water-cut means determines the water-cut WC in accordance with the following equation when the fluid in the stream is in the oil-continuous phase $$WC = E + F(Z) \qquad (c)$$

where E and F are coefficients and Z is the fluid impedance.

19. A monitor as described in claim 16 in which the water-cut includes:
   probe means inserted in the stream of fluid for being responsive to the impedance of the fluid,
   means connected to the probe means for providing the high frequency signal in the range of 1 to 60 MHz to the probe means which is affected by the impedance of the fluid,
   means connected to the probe means for providing a current signal and a voltage signal proportional to the impedance of the fluid filled prober, and
   means receiving the current signal and the voltage signal for providing a signal related to the phase difference between the current and voltage signals.

20. A monitor as described in claim 19 in which the water-cut means determines the impedance of the fluid in accordance with the current signal, the voltage signal and the phase difference signal.

21. An analyzer as described in claim 20 in which the water-cut monitor utilizes equations (a) and (b) when the phase difference signal indicates a phase difference less than a predetermined value and utilizes equation (c) when the phase difference signal indicates a phase difference equal to or greater than the predetermined value.

* * * * *